(12) United States Patent
Kwak et al.

(10) Patent No.: US 9,810,130 B2
(45) Date of Patent: Nov. 7, 2017

(54) GENERATOR FOR INTERNAL COMBUSTION ENGINE

(71) Applicant: HYUNDAI MOTOR COMPANY, Seoul (KR)

(72) Inventors: Jin Woo Kwak, Gyeongsan-si (KR); In Woong Lyo, Suwon-si (KR); Kyong Hwa Song, Seoul (KR); Su Jung Noh, Seoul (KR); In Chang Chu, Seoul (KR); Gyung Bok Kim, Seoul (KR); Seung Woo Lee, Seoul (KR); Han Saem Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 205 days.

(21) Appl. No.: 14/659,527

(22) Filed: Mar. 16, 2015

(65) Prior Publication Data

US 2016/0102592 A1    Apr. 14, 2016

(30) Foreign Application Priority Data

Oct. 14, 2014    (KR) .................. 10-2014-0138509

(51) Int. Cl.

| | |
|---|---|
| *F02B 63/00* | (2006.01) |
| *F01N 5/02* | (2006.01) |
| *F02B 63/04* | (2006.01) |
| *F01N 13/10* | (2010.01) |
| *F02B 77/11* | (2006.01) |
| *F02B 77/13* | (2006.01) |
| *F02B 75/16* | (2006.01) |

(52) U.S. Cl.
CPC ........... *F01N 5/025* (2013.01); *F01N 13/102* (2013.01); *F02B 63/04* (2013.01); *F02B 77/11* (2013.01); *F02B 63/044* (2013.01); *F02B 75/16* (2013.01); *F02B 77/13* (2013.01); *F02B 2063/045* (2013.01); *Y02T 10/16* (2013.01); *Y02T 10/166* (2013.01)

(58) Field of Classification Search
CPC .. F02B 63/04; F02B 2063/045; F02B 63/044; F02B 77/13; F02B 75/16
USPC ............................................................ 123/2
See application file for complete search history.

(56) References Cited

U.S. PATENT DOCUMENTS

| | | | |
|---|---|---|---|
| 6,245,986 B1* | 6/2001 | Holland | ................ H01L 35/32 136/205 |
| 2010/0146949 A1* | 6/2010 | Stobart | ............. B60H 1/00492 60/300 |

(Continued)

FOREIGN PATENT DOCUMENTS

| | | |
|---|---|---|
| JP | 2000-297632 A | 10/2000 |
| JP | 2000-328981 A | 11/2000 |

(Continued)

*Primary Examiner* — Jacob Amick
*Assistant Examiner* — Charles Brauch
(74) *Attorney, Agent, or Firm* — McDermott Will & Emery LLP

(57) ABSTRACT

The present disclosure relates to a generator for an internal combustion engine. The generator for an internal combustion engine includes: a heat protector configured to cover an exhaust manifold in which exhaust gas flows to absorb heat energy emitted from the exhaust manifold; and a thermoelectric module configured to be disposed on the heat protector to generate electric energy from heat energy absorbed by the heat protector.

13 Claims, 7 Drawing Sheets

(56) References Cited

U.S. PATENT DOCUMENTS

2012/0198841 A1    8/2012  Sloss
2012/0204557 A1*   8/2012  Jebasinski ............... F01N 13/10
                                                         60/605.1

FOREIGN PATENT DOCUMENTS

| JP | 2003-065045 A  | 3/2003  |
| JP | 2007-006619 A  | 1/2007  |
| JP | 2014-127617 A  | 7/2014  |
| JP | 2014-195011 A  | 10/2014 |
| KR | 10-0869322 B1  | 11/2008 |

* cited by examiner

GENERATOR FOR INTERNAL COMBUSTION ENGINE

CROSS-REFERENCE TO RELATED APPLICATION

This application is based on and claims the benefit of priority to Korean Patent Application No. 10-2014-0138509, filed on Oct. 14, 2014 in the Korean Intellectual Property Office, the disclosure of which is incorporated herein in its entirety by reference.

TECHNICAL FIELD

The present disclosure relates to a generator for an internal combustion engine, and more particularly, to a generator for an internal combustion engine capable of improving fuel efficiency of an existing internal combustion engine by utilizing and converting high-temperature waste heat generated in an engine into electric energy.

BACKGROUND

Recently, a thermoelectric generation system using a thermoelectric element for utilizing waste heat generated in a vehicle has been developed. However, most of the developed thermoelectric generation systems for a vehicle have been applied to an exhaust muffler or exhaust pipe. Since heat energy emitted from the exhaust muffler or exhaust pipe is relatively small as compared to combustion heat generated in an engine, there is a limitation in that a high output value is not implemented.

SUMMARY

The present disclosure has been made to solve the above-mentioned problems occurring in the prior art while advantages achieved by the prior art are maintained intact.

An aspect of the present disclosure provides a structure capable of effectively recycling combustion heat generated in an engine.

Another aspect of the present disclosure provides a generator for an internal combustion engine capable of utilizing a commercialized thermoelectric element regardless of an application position.

The technical objects of the present disclosure are not limited to the above-mentioned technical objects, and other technical objects that are not mentioned will be clearly understood by those skilled in the art through the following descriptions.

According to an exemplary embodiment of the present disclosure, a generator for an internal combustion engine includes: a heat protector configured to cover an exhaust manifold in which exhaust gas flows to absorb heat energy emitted from the exhaust manifold; and a thermoelectric module configured to be disposed on the heat protector to generate electric energy from the heat energy absorbed by the heat protector.

According to another exemplary embodiment of the present disclosure, a generator for an internal combustion engine includes: a thermoelectric module configured to be disposed between a suction stage and an exhaust stage of an exhaust manifold in which exhaust gas flows to absorb heat energy emitted from the exhaust manifold; and a cooling jacket configured to absorb the heat energy from the thermoelectric module.

Details of embodiments will be described below with reference to the accompanying drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
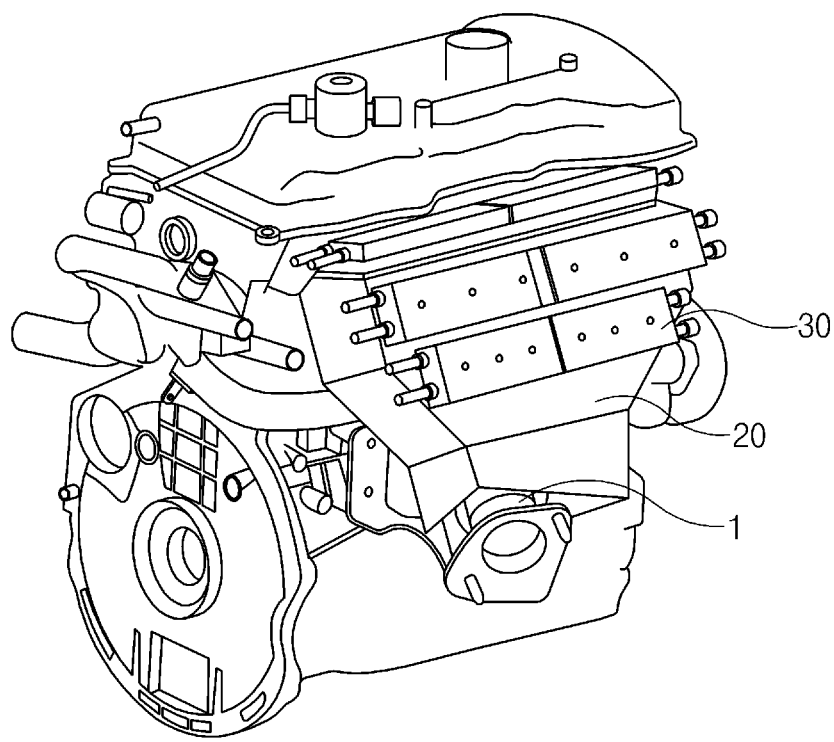
FIG. 1 is a perspective diagram showing a form in which a generator for an internal combustion engine according to an exemplary embodiment of the present disclosure is disposed in an engine.

Advantages and features of the present disclosure and methods to achieve them will be elucidated from exemplary embodiments described below in detail with reference to the accompanying drawings.

However, the present disclosure is not limited to the exemplary embodiment disclosed herein but will be implemented in various forms. The exemplary embodiments make disclosure of the present disclosure thorough and are provided so that those skilled in the art can easily understand the scope of the present disclosure. Therefore, the present disclosure will be defined by the scope of the appended claims. Like reference numerals throughout the description denote like elements.

Hereinafter, a generator for an internal combustion engine according to exemplary embodiments of the present disclosure will be described with reference to the accompanying drawings.

Figure 2:
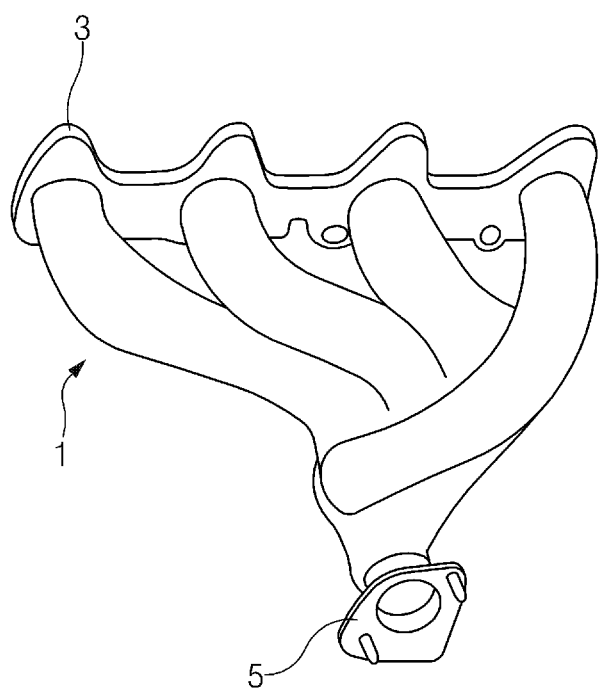
FIG. 2 is a perspective diagram of an exhaust manifold according to an exemplary embodiment of the present disclosure.
Figure 7:
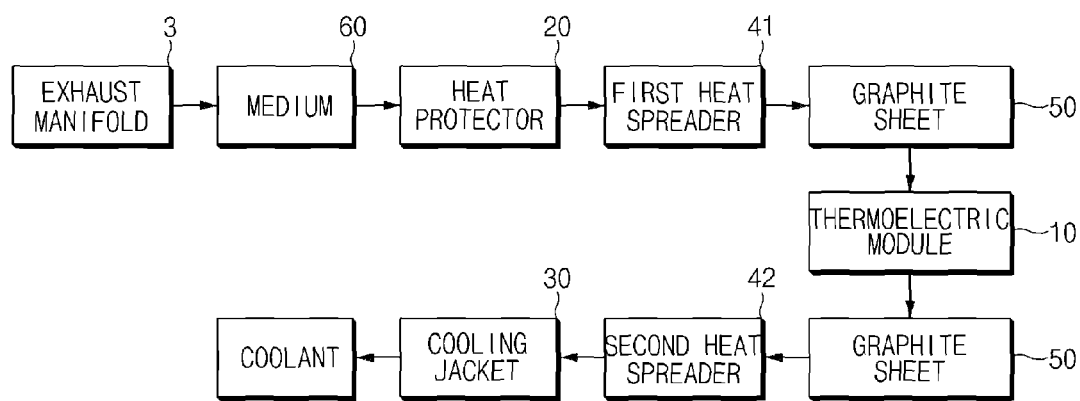
FIG. 7 is a block diagram showing that heat energy emitted from the exhaust manifold is transferred to the generator for an internal combustion engine according to an exemplary embodiment of the present disclosure.

FIG. 1 is a perspective diagram showing a form in which a generator for an internal combustion engine according to an exemplary embodiment of the present disclosure is disposed in an engine. FIG. 2 is a perspective diagram of an exhaust manifold 1 according to an exemplary embodiment of the present disclosure. FIG. 7 is a block diagram showing that heat energy emitted from the exhaust manifold 1 is transferred to the generator for an internal combustion engine according to an exemplary embodiment of the present disclosure.

Referring to FIGS. 1, 2, and 7, the generator for an internal combustion engine according to an exemplary embodiment of the present disclosure includes a heat protector 20 covering an exhaust manifold 1 in which exhaust gas flows to absorb heat energy emitted from the exhaust manifold 1; and a thermoelectric module 10 (also see FIG. 6) disposed on the heat protector 20 to generate electric energy from the heat energy absorbed by the heat protector 20.

The exhaust manifold 1, which is a component connected to an exhaust port of the internal combustion engine, is a device collecting combusted exhaust gas to emit the collected exhaust gas through an exhaust pipe.

The exhaust manifold 1 is formed of a manifold having several branches so as to be connected to a plurality of combustion chambers.

The heat protector 20 blocks heat emitted from the exhaust manifold 1 to protect components in a vehicle. The heat protector 20 covers the exhaust manifold 1 to absorb heat energy.

The thermoelectric module 10 includes a thermoelectric element generating electric energy through movement of heat energy by a Seebeck effect. The generated electric energy is stored in a battery. The thermoelectric module 10 generates electric energy through heat emitted from the exhaust manifold 1.

Figure 3:
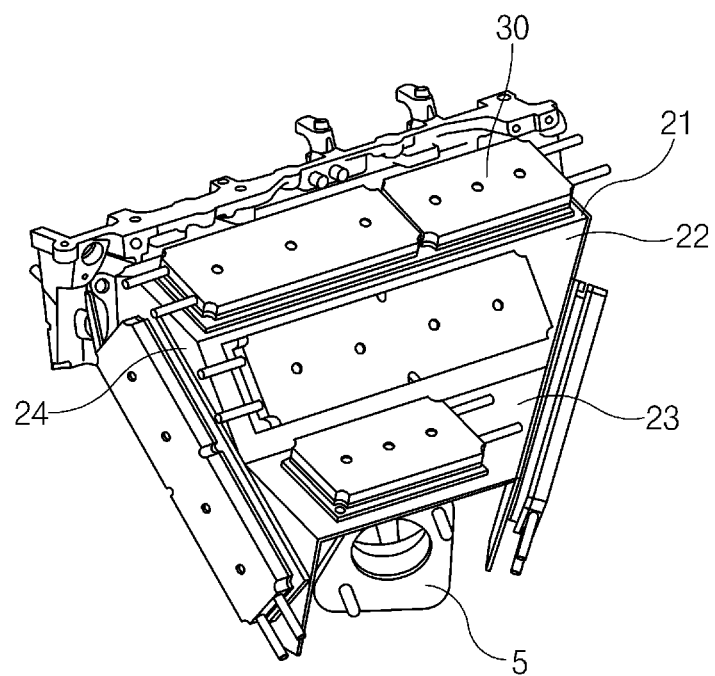
FIG. 3 is a perspective diagram of the generator for an internal combustion engine according to an exemplary embodiment of the present disclosure.
Figure 4:
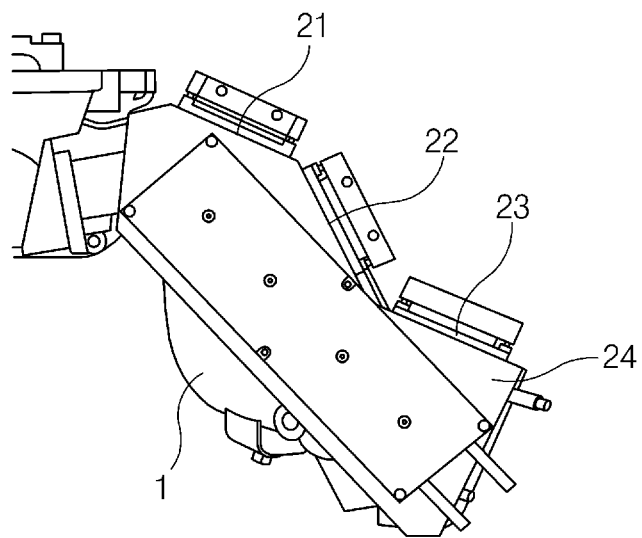
FIG. 4 is a left side diagram of the generator for an internal combustion engine according to an exemplary embodiment of the present disclosure.
Figure 5:
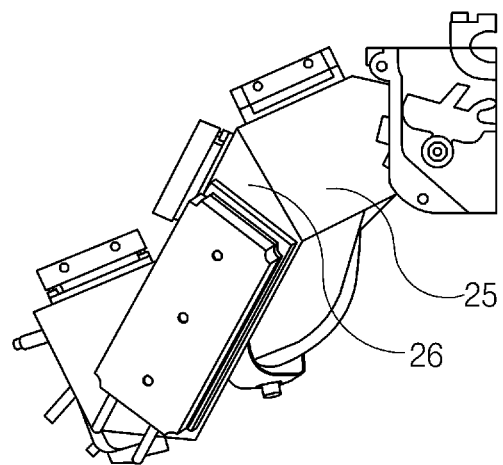
FIG. 5 is a right side diagram of the generator for an internal combustion engine according to an exemplary embodiment of the present disclosure.

FIG. 3 is a perspective view of the generator for an internal combustion engine according to an exemplary embodiment of the present disclosure. FIG. 4 is a left side diagram of the generator for an internal combustion engine according to an exemplary embodiment of the present disclosure. FIG. 5 is a right side diagram of the generator for an internal combustion engine according to an exemplary embodiment of the present disclosure.

Referring to FIGS. 3 to 5, the heat protector 20 includes heat transfer panels 21, 22, 23, 24, 25, and 26 coming in contact with the thermoelectric module 10 and formed to be flat. The heat transfer panels 21, 22, 23, 24, 25, and 26 may be made of a metallic material having excellent conductivity. The heat transfer panels 21, 22, 23, 24, 25, and 26 may have a shape enclosing the exhaust manifold 1. Since the heat transfer panels 21, 22, 23, 24, 25, and 26 absorb heat from the exhaust manifold 1, an influence on a catalyst stage is decreased.

The heat transfer panels 21, 22, 23, 24, 25, and 26 are provided in plural, and the heat protector 20 is formed by connecting the plurality of heat transfer panels 21, 22, 23, 24, 25, and 26 to one another. The heat protector 20 is formed to be flat in order to maximize a contact area with the thermoelectric module 10. The heat transfer panels 21, 22, 23, 24, 25, and 26 are formed to be flat.

The heat transfer panels 21, 22, 23, 24, 25, and 26 are provided in plural, and the plurality of heat transfer panels 21, 22, 23, 24, 25, and 26 include a first panel 21 disposed on a suction stage 3 of the exhaust manifold 1; a second panel 22 disposed on a portion of the exhaust manifold 1; and a third panel 23 disposed adjacent to an exhaust stage 5 of the exhaust manifold 1 so that the second panel 22 is disposed between the first and third panels 21 and 23 and angularly connected to the first and third panels 21 and 23. The first panel 21, the second panel 22, and the third panel 23 are disposed to be inclined.

The heat transfer panels 21, 22, 23, 24, 25, and 26 according to an exemplary embodiment of the present disclosure include a fourth panel 24 disposed at a side surface of the exhaust manifold 1 and angularly connected to side end portions of the first to third panels. The heat transfer panels 21, 22, 23, 24, 25, and 26 according to an exemplary embodiment of the present disclosure include a fifth panel 25 angularly connected to another side end portion of the first panel 21 and disposed on a surface facing the fourth panel 24. The heat transfer panels 21, 22, 23, 24, 25, and 26 according to an exemplary embodiment of the present disclosure include a sixth panel 26 angularly connected to the second, third, and fifth panels 22, 23, and 25 and disposed on the surface facing the fourth panel 24.

The thermoelectric module 10 is disposed on each of the first to sixth panels 21 to 26. Therefore, the first to sixth panels 21 to 26 may have a shape completely enclosing upper and side surfaces of the exhaust manifold. In addition, since the first to sixth panels 21 to 26 are formed to be flat, portions coming in contact with the thermoelectric module 10 may be maximized. Further, a plurality of thermoelectric modules 10 may be disposed, such that an absorption rate of waste heat energy may be increased. In addition, appearances and areas may be easily changed by adjusting areas and angles of the first to sixth panels 21 to 26.

Since heat energy emitted from the heat transfer panels 21 to 26 per unit area is changed by changing the appearances and the areas, thermoelectric modules 10 having different specifications from each other may be disposed. That is, the heat protector 20 may be changed so as to be suitable for heat resistance of the thermoelectric module 10. In addition, efficiency of the generator for an internal combustion engine may be increased by attaching a thermoelectric module 10 for a high temperature.

Figure 6:
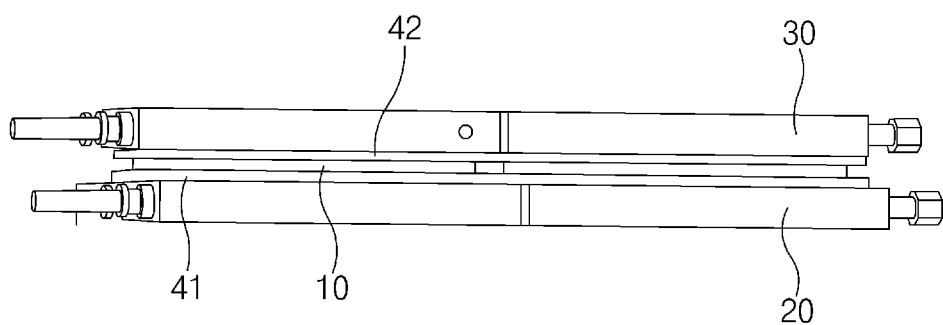
FIG. 6 is a cross-sectional diagram of the generator for an internal combustion engine according to an exemplary embodiment of the present disclosure.

FIG. 6 is a cross-sectional diagram of the generator for an internal combustion engine according to an exemplary embodiment of the present disclosure.

Referring to FIGS. 6 and 7 again, the generator for an internal combustion engine according to an exemplary embodiment of the present disclosure includes a cooling jacket 30 absorbing heat energy from the thermoelectric module 10.

The generator for an internal combustion engine according to an exemplary embodiment of the present disclosure includes the thermoelectric module 10 disposed between the suction stage 3 and the exhaust stage 5 of the exhaust manifold 1 in which the exhaust gas flows to absorb heat energy emitted from the exhaust manifold 1; and the cooling jacket 30 absorbing the heat energy from the thermoelectric module 10. A cooling channel in which a coolant flows is formed in the cooling jacket 30. The cooling jacket 30 absorbs heat energy from the thermoelectric module 10 to promote formation of electric energy.

The generator for an internal combustion engine according to an exemplary embodiment of the present disclosure includes a first heat spreader 41 disposed between the thermoelectric module 10 and the heat protector 20; and a second heat spreader 42 disposed between the cooling jacket 30 and the thermoelectric module 10.

The heat spreader serves to uniformly disperse heat energy. Therefore, the heat spreader uniformly supplies heat energy to the thermoelectric module 10. The first heat spreader 41 has a size larger than that of the second heat spreader 42. Therefore, it is possible to prevent a temperature from being non-uniform due to the cooling in the vicinity of an edge of the thermoelectric module 10. In addition, a coupling part for the coupling with the heat protector 20 may be secured.

The generator for an internal combustion engine according to an exemplary embodiment of the present disclosure includes graphite sheets 50 disposed between the first heat spreader 41 and the thermoelectric module 10 and between the thermoelectric module 10 and the second heat spreader 42, respectively. The graphite sheet 50 minimizes heat transfer resistance at an interface and absorbs vibration.

The generator for an internal combustion engine according to an exemplary embodiment of the present disclosure includes a medium 60 disposed between the heat protector 20 and the exhaust manifold 1 so as to adjust movement of heat energy. A surface temperature of a cover may be controlled by filling or attaching a heat conductive material into the heat protector 20. That is, in the case of attaching a thermoelectric module 10 for a low temperature, a medium 60 having low heat conductivity is disposed, and in the case of attaching a thermoelectric module 10 for a high temperature, a medium 60 having high heat conductivity is disposed.

As set forth above, according to the exemplary embodiment of the present disclosure, the following advantages may be provided.

First, combustion heat generated in the engine may be effectively recycled.

Second, the commercialized thermoelectric element may be utilized regardless of an application position.

Third, since only waste heat energy is used, an influence on an activation temperature of a catalyst stage may be minimized.

The effects of the present disclosure are not limited to the above-mentioned effects, and other effects that are not mentioned will be clearly understood by those skilled in the art through the accompanying claims.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A generator for an internal combustion engine comprising:
    a cooling jacket in which a coolant flows;
    a heat protector configured to cover an exhaust manifold in which exhaust gas flows to absorb heat energy emitted from the exhaust manifold;
    a thermoelectric module configured to be disposed between the heat protector and the cooling jacket to generate electric energy;
    a first heat spreader disposed between the thermoelectric module and the heat protector, and configured to uniformly disperse the heat energy; and
    a second heat spreader disposed between the cooling jacket and the thermoelectric module, and configured to uniformly disperse the heat energy.

2. The generator for an internal combustion engine according to claim 1, wherein the heat protector includes a heat transfer panel coming in contact with the thermoelectric module and formed to be flat.

3. The generator for an internal combustion engine according to claim 2, wherein the heat transfer panel is provided in plural, and the heat protector is formed by connecting the plurality of heat transfer panels to one another.

4. The generator for an internal combustion engine according to claim 2, wherein the heat transfer panel is provided in plural, and
    the plurality of heat transfer panels include:
    a first panel disposed on a suction stage of the exhaust manifold;
    a second panel disposed on the exhaust manifold; and
    a third panel disposed adjacent to an exhaust stage of the exhaust manifold, the second panel being disposed between the first and third panels and angularly connected to the first and third panels.

5. The generator for an internal combustion engine according to claim 4, wherein the first to third panels are disposed to be inclined.

6. The generator for an internal combustion engine according to claim 4, further comprising a fourth panel disposed at a side surface of the exhaust manifold, and configured to be angularly connected to side end portions of the first to third panels.

7. The generator for an internal combustion engine according to claim 6, further comprising a fifth panel configured to be angularly connected to another side end portion of the first panel and be disposed on a surface facing the fourth panel.

8. The generator for an internal combustion engine according to claim 7, further comprising a sixth panel configured to be angularly connected to the second, third, and fifth panels and be disposed on the surface facing the fourth panel.

9. The generator for an internal combustion engine according to claim 8, wherein the thermoelectric module is disposed on each of the first to sixth panels.

10. The generator for an internal combustion engine according to claim 1, wherein a cooling channel in which the coolant flows is formed in the cooling jacket.

11. The generator for an internal combustion engine according to claim 1, wherein the first heat spreader has a size larger than that of the second heat spreader.

12. The generator for an internal combustion engine according to claim 1, further comprising graphite sheets configured to be disposed between the first heat spreader and the thermoelectric module, and between the thermoelectric module and the second heat spreader, respectively.

13. The generator for an internal combustion engine according to claim 1, further comprising a medium configured to be disposed between the heat protector and the exhaust manifold so as to adjust movement of heat energy.

* * * * *